Aug. 4, 1936.  J. S. FASTING  2,049,734

MANUFACTURE OF CEMENT

Filed Feb. 7, 1935    3 Sheets-Sheet 1

INVENTOR
Johan S. Fasting
BY
Redding, Greeley & O'Shea
ATTORNEYS

Aug. 4, 1936.  J. S. FASTING  2,049,734
MANUFACTURE OF CEMENT
Filed Feb. 7, 1935  3 Sheets—Sheet 2
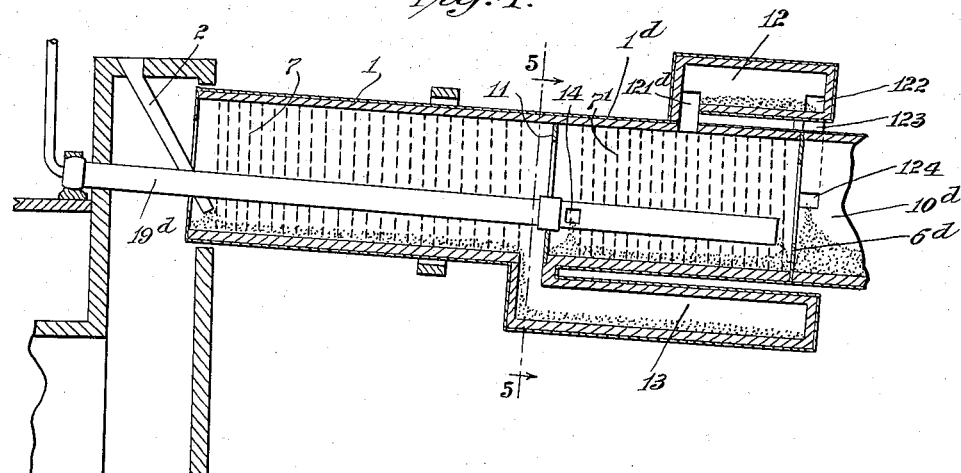
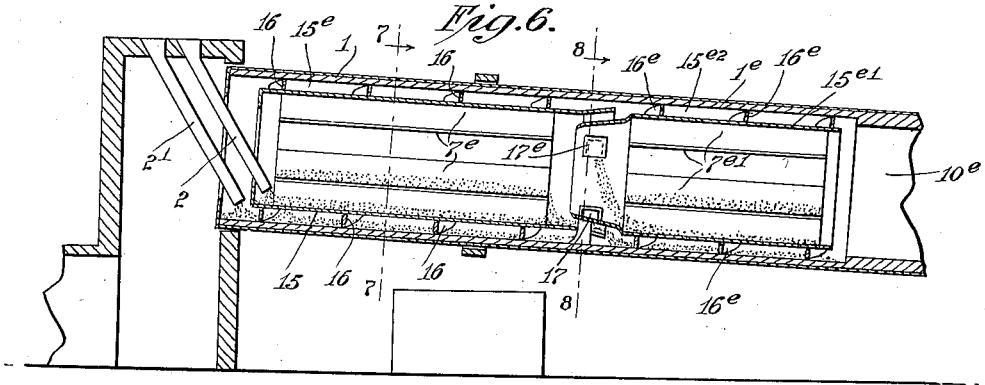
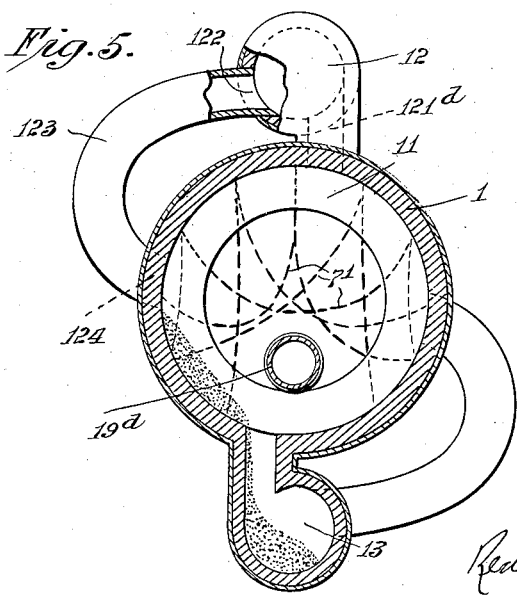
INVENTOR
Johan S. Fasting
BY
Redding, Greeley & O'Shea
ATTORNEYS Aug. 4, 1936.  J. S. FASTING  2,049,734
MANUFACTURE OF CEMENT
Filed Feb. 7, 1935   3 Sheets-Sheet 3
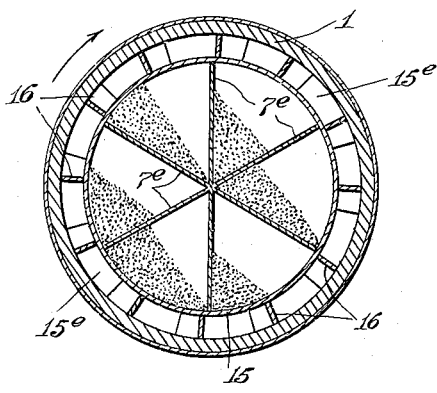
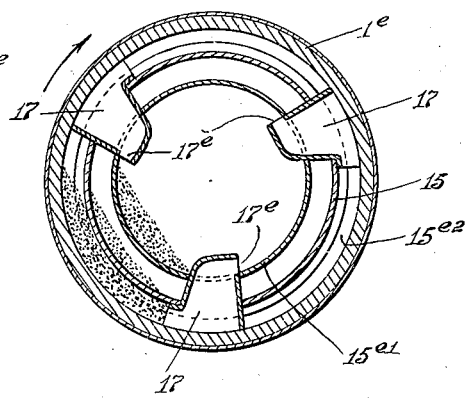
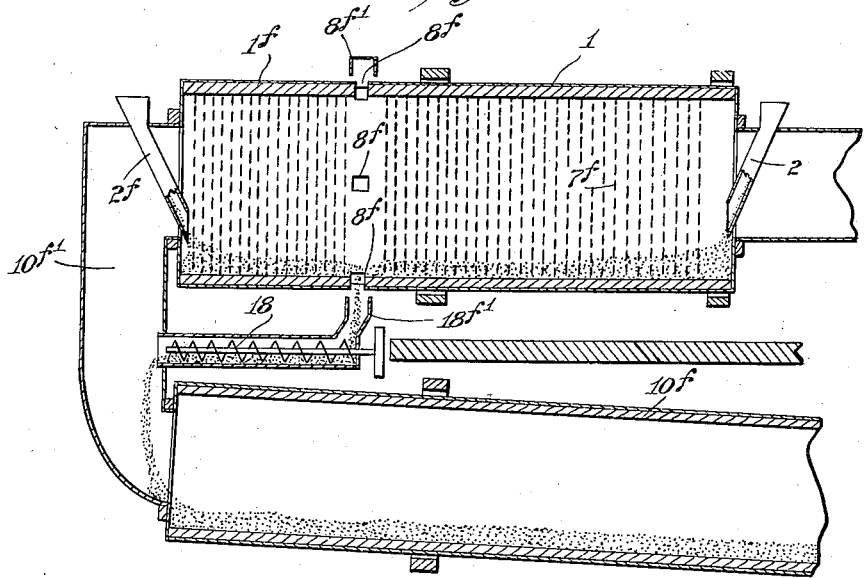
INVENTOR
Johan S. Fasting
BY Redding, Greeley & O'Shea
ATTORNEYS Patented Aug. 4, 1936

2,049,734

UNITED STATES PATENT OFFICE 2,049,734

MANUFACTURE OF CEMENT

Johan S. Fasting, Valby, near Copenhagen, Denmark, assignor to F. L. Smidth & Co., New York, N. Y., a corporation of New Jersey Application February 7, 1935, Serial No. 5,333
In Great Britain February 12, 1934

5 Claims. (Cl. 263—33)

This invention relates to the manufacture, whether by the wet process or the dry process, of hydraulic cement in rotary kilns. In the manufacture of cement as commonly carried on in rotary kilns, all of the cement raw material, whether dry or in the form of slurry, is introduced into the kiln at its upper or feeding end while the fuel is supplied at the lower or discharge end, the hot combustion gases and the cement material passing through the kiln in opposite directions. It is usual also to provide in the upper zones of the kiln devices, such as chains or lifters or plates, by which the interchange of heat between the hot combustion gases and the cement material is accomplished. The effect of heat interchange or transmitting devices depends to some extent on the length of that portion of the kiln in which they are installed, their effect being somewhat in proportion to the length of the kiln in which they are installed. In the zones of the kiln in which they are installed the cement material is first dried and heated preliminarily and is then subjected, usually, to a partial or complete calcination. They are not usually installed in the sintering zone. Wherever they are installed the effect of the intense heat to which they are subjected particularly where they are first met by the hot combustion gases has been more or less destructive of the heat transmitting members, even when they are made of heat resisting steel alloys. Various means have been proposed for the protection of the heat transmitting devices, particularly those which are last in the kiln and therefore most exposed to the destructive action. It has been proposed, for example, to introduce into the kiln relatively cold air for the purpose of cooling the lowest of the heat transmitting devices, but obviously this results in a substantial reduction in the heat economy of the kiln. The general object of the present invention is to provide means whereby the heat transmitting devices may extend a considerable distance downward in the kiln from the feeding end and be protected against the destructive action of the intensely hot combustion gases while at the same time the reduction of the heat economy of the kiln is avoided.

In accordance with the invention the cement raw material is delivered to the kiln at different points in its length, a portion of the material being delivered at the upper or feeding end of the kiln and another portion at a point somewhat remote from the feeding end and below some or all of the heat transmitting devices. That portion of the material which is introduced at the feeding end of the kiln is dried and heated and perhaps partially calcined, these operations being promoted by the devices which effect the transmission of heat from the hot gases to the material. The material which is introduced at a lower point of the kiln is relatively cold and, even in the practice of the dry process, contains some moisture. The relatively cold material so introduced absorbs some of the heat of the hot gases, reducing their temperature before they strike the heat transmitting devices, such reduction of the temperature being further promoted by the evaporation of whatever moisture may be contained in the material. Particularly effective protection of the heat transmitting devices is accomplished when a portion of the material is introduced immediately below the heat transmitting devices and is caused to move through them for some distance in the same direction in which the hot gases move, the hottest gases thus coming into contact with the material when it is coldest.

It will be obvious that the invention may be realized or embodied in different mechanical arrangements, several of which will now be described with reference to the accompanying drawings in which they are illustrated, and in which:

Figures 2, 3 and 4 are views generally similar to that presented in Figure 1, but showing different embodiments to be described, the heat transmitting devices in all of these figures being indicated as chains.

Figure 5 is a view in transverse section on the plane indicated by the broken line 5—5 of Figure 4, looking in the direction of the arrows.

Figure 6 is a view of the same general character as that represented in Figures 1, 2, 3 and 4, the heat transmitting devices being represented in this instance as radial plates.

Figures 7 and 8 are views in transverse section on the planes indicated respectively by the broken lines 7—7 and 8—8 of Figure 6.

Figure 9 is a view in longitudinal, central section of an arrangement in which parts of the kiln are on different axes and in which the cement material is fed into one part of the kiln at both ends thereof and is discharged therefrom at an intermediate point.

Figure 1:
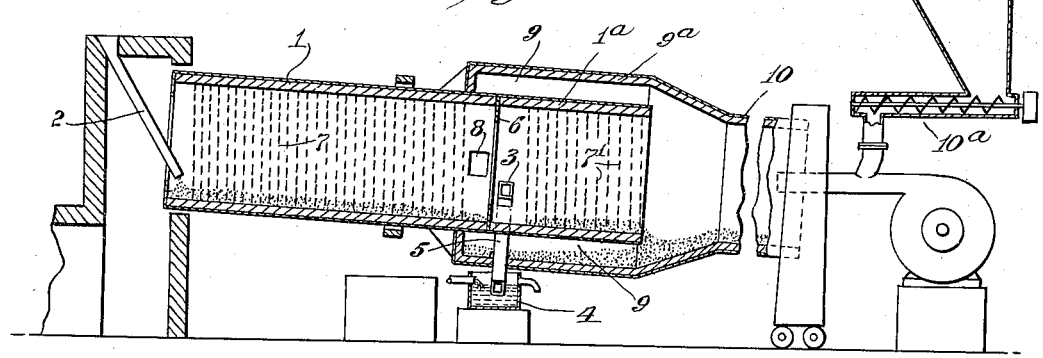
Figure 1 is a view in longitudinal, central section of one form of kiln in which the invention may be realized and embodied, the kiln being shown as broken away near the lower end to save space.

In the embodiment of the invention illustrated in Figure 1, the upper portion of the kiln is shown as consisting of two sections 1 and 1a of uniform diameter and rotating as one. A portion of the cement raw material, indicated in this instance as in the form of slurry, is fed to the kiln at its upper end as by a chute 2 from any suitable source. The other portion of the material is delivered to a suitable trough 4, from which it is raised by a scoop or scoops, one of which is shown at 5, and is discharged into the section 1a through a port or ports, one of which is shown at 3. Between the sections 1 and 1a is placed a baffle ring 6 which serves to prevent the intermingling of the material in the two sections without interfering with the passage of the hot gases of combustion. Both sections 1 and 1a are shown as provided with heat transmitting devices, such as chains, indicated at 7 and 7', and at the lower end of section 1 is shown a port 8 through which the material which has passed through the section 1 is discharged into an annular chamber 9 formed by an enlargement 9a of the kiln shell. The kiln is continued, as indicated at 10, to the discharge end where the fuel may be supplied as usual, as indicated at 10a. The material delivered to the section 1a at its upper end passes onward toward the discharge end of the kiln and is delivered to the continuation of the kiln through the open end of the annular chamber 9 where it mingles with the material which has passed through the upper section 1 and has been discharged therefrom into the annular chamber 9. The relatively cold material which is introduced into the section 1a absorbs some of the heat of the hot gases which enter the open end of the section 1a and protects the heat transmitting bodies in the section 1 and the heat transmitting bodies in the section 1a, if they are there installed, from the destructive action of the hot gases. The cooling of the hot gases is promoted by the evaporation of the water in the slurry. It will be obvious that the heat of the hot gases is fully utilized in the process and that there is no reduction of the heat economy of the kiln.

Figure 2:
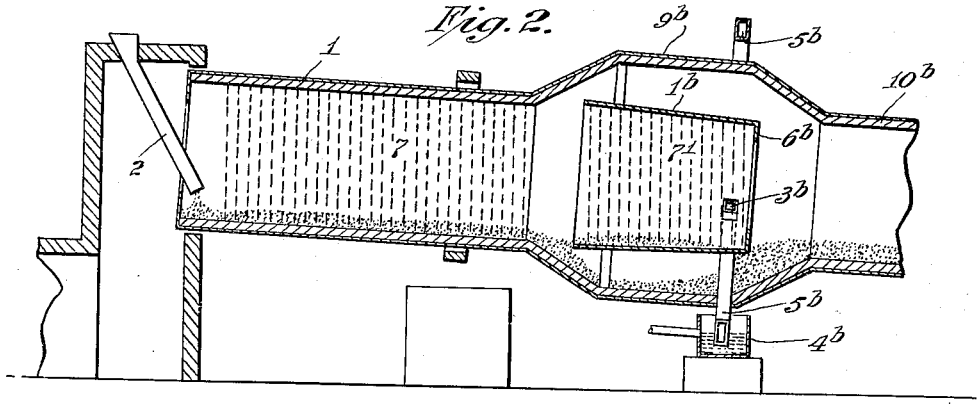

In the embodiment of the invention illustrated in Figure 2 a portion of the slurry is delivered as before through a chute 2 into the section 1 of the kiln at its upper end and at the lower end of that section passes directly into the enlarged section 9b of the kiln shell from which it passes on into the continuation 10b of the shell. The slurry is delivered as before to a trough 4b from which it is raised and discharged by a scoop or scoops 5b, through a port or ports 3b in a kiln section 1b which is supported coaxially within the shell 9b leaving an annular chamber about it. The section 1b is in this instance formed as a truncated cone with its larger open end toward the feeding end of the kiln and its smaller end provided with a baffle ring 6b which prevents the escape of material at that end while permitting flow of the hot gases. In this instance the relatively cold and moisture bearing material is introduced into the section 1b at its lower end and, by reason of the enlargement of that section toward its upper end, moves toward the upper end and in the same direction with the hot gases, whereby the gases at their hottest are brought into contact with the material at its coldest. The material is discharged from the section 1b at its upper end into the annular space within the enlarged section 9b and is there mingled with the material which has passed through the section 1 and with it passes onward in the kiln as before.

Figure 3:
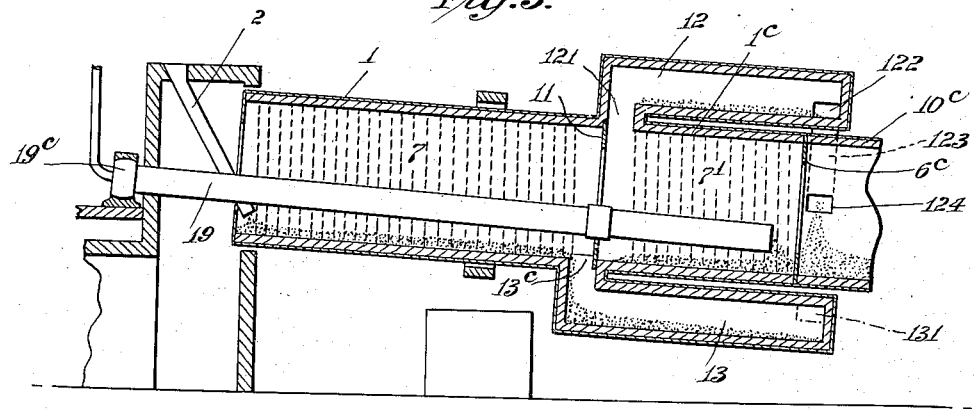

In the modification shown in Figure 3 a portion of the slurry is delivered through a chute 2 into the section 1 of the kiln at its upper end and at the lower end of that section passes through a port 13c, when it is at and near its lowest point in the rotation of the kiln, into a tube 13, mounted on the shell of the kiln and axially parallel therewith. At its right hand end the tube communicates interiorly, through a conduit 131 and a port 132, with the continuation 10c of the kiln which it enters, when the tube 13 is at and near its highest position in the rotation of the kiln. The other portion of the slurry or, it might be in this instance, dry cement material, unheated, enters through a rotating pipe 19 supported in a suitable bearing at 19c and also on a baffle ring 11 and is delivered within the section 1c above a baffle ring 6c. In the continued rotation of the section 1c with the section 1 the cement material supplied through the tube 19 travels toward the feeding end of the kiln within the section 1c and passes therefrom through a port 121, when the port is at and near its lowest position into a tube 12 carried by the kiln shell and axially parallel therewith and when this tube is in or near its highest position passes therefrom through a port 122, a conduit 123, and a port 124 into the continuation 10c of the kiln and is there mingled with the material which has been delivered through the tube 13. Heat transmitting devices are installed in the section 1, as indicated at 7, and may also be installed in the section 1c, as indicated at 7'. As before the relatively cool material introduced through the rotating pipe 19 absorbs heat from the hot gases which meet it through the baffle ring 6c and thereby protects the heat transmitting devices from the destructive action of the intensely hot gases, without reduction of the heat economy of the kiln.

The modification illustrated in Figure 4 is substantially similar to that illustrated in Figure 3, the material introduced through the chute 2 passing from the first section by way of the tube 13 into the continuation 10d, while the other portion of the material, introduced through the rotating tube 19d, is in part discharged therefrom at the lower end of the section 1d of the kiln. In this instance the tube 19d is provided with a port 14 at the upper end of the section 1d and a portion of the material supplied through the tube 19d is discharged through that port into the upper end of the section 1d. In this instance the material treated in the section 1d passes therefrom through a port 121d, located at about the middle line of the section 1d, into a tube 12 from which it is delivered as before through a port 122, a conduit 123, and a port 124 into the continuation 10d of the kiln. It will be understood that as before the material passes into the tube 12 when such tube is at and near its lowest position and is discharged therefrom when it is in its highest position. A baffle ring 6d is provided as before at the lower end of the section 1d. The heat transmitting devices are represented in this instance as chains 7 and 7'.

The construction shown in Figure 6 is designed for the utilization of radial plates as heat transmitting devices. Within the upper section 1 of the kiln there is supported a cylindrical shell 15 of smaller diameter leaving an annular chamber 15e through which the supplemental portion of the material, received through the chute 2', passes onward within the kiln shell but out of the path of the hot gases, the onward movement of this material being promoted if desired by flights 16 which also serve to support the cylinder 15 within the section 1. The cylinder 15 is divided by radial, longitudinally extended plates 7e which constitute, in this instance, the heat transmitting devices, the material which is supplied at the upper end of the cylinder 15 through a chute 2 being distributed, in the rotation of the kiln, in the longitudinal chambers formed by the radial plates 7e, both the material and the plates being heated by the hot gases which pass through the chambers toward the upper end of the kiln. Lower down in the kiln, in the section 1e, there is mounted a similar cylinder 15e1 forming within the kiln shell an annular chamber 15e2 which is provided with flights 16e, the cylinder 15e1 being divided interiorly by radial, longitudinally extended plates 7e1. The material which passes through the chambers of the cylinder 15 passes by gravity from the lower end of that cylinder into the annular space 15e2 between the cylinder 15e1 and the shell 1e, while the material, which passes through the annular chamber 15e outside the cylinder 15, is raised by scoops 17 and is delivered through ports 17e into the open upper end of the cylinder 15e1. The material which passes through the longitudinal chambers in the cylinder 15e1 and the material which passes through the annular chamber 15e2 is mingled as it leaves the cylinder 15e1 and passes onward through the continuation 10e of the kiln. It will be obvious that by the introduction into the lower cylinder 15e1 of the relatively cool material the transmitting devices 7e1 are protected from the destructive action of the hot gases.

In the several embodiments of the invention thus far described the kiln is assumed to be a cylinder of uniform diameter, except as it may be enlarged at an intermediate point, as indicated in Figures 1 and 2, the sections referred to being formed independently of each other or in one, as the design may suggest, but in the embodiment of the invention illustrated in Figure 9 the kiln is represented not as having all of its parts axially in line but as having the drying, heating and pre-calcining zones in a cylindrical shell composed of sections which may be formed as one or independently of each other as may be desired, while the continuation of the kiln, in which the sintering zone is located is not axially aligned with the upper portion. In this construction a portion of the material is supplied through a chute 2 at one end of a section 1, armed with heat transmitting devices indicated as chains 7f and the other or supplemental portion of the material is delivered through a chute 2f at the opposite end of the section 1f which is coaxial with the section 1 and may be formed therewith. In this instance the hot combustion gases from the portion 10f of the kiln are discharged through a conduit 10f1 into the section 1f above mentioned in which they meet the relatively cool material which is supplied through the chute 2f, such relatively cool material protecting the heat transmitting devices as before. The material in the section 1 and the material in the section 1f flows toward a median line where it mingles and is discharged through ports 8f and a surrounding ring 8f1 and a chute 18f1 into a conveyor 18 from which it is discharged through the conduit 10f1 into the continuation 10f of the kiln.

It will be understood that various changes in details of construction and arrangement can be made to suit different conditions of use and that the invention is not restricted either as to the method in which it is realized or the apparatus in which it is embodied, except as pointed out in the accompanying claims.

I claim as my invention:

1. The combination in a rotary kiln of means to introduce fuel at the discharge end of the kiln, a kiln section having heat transmitting devices therein, a second kiln section also having heat transmitting devices therein, means to introduce raw material at the upper end of the first section, means to prevent passage of the raw material from the first section into the second section while permitting passage of hot gases of combustion from the second section to the first section, means to introduce other raw materials into the second section independently of the raw material introduced at the upper end of the first section, and means to mingle the material from the first section and the material discharged from the second section.

2. The combination in a rotary kiln of means to introduce fuel at the discharge end of the kiln, a kiln section having heat transmitting devices therein, a second kiln section also having heat transmitting devices therein, means to introduce raw material at the upper end of the first section, means to prevent passage of the raw material from the first section into the second section while permitting passage of hot gases of combustion from the second section to the first section, means to introduce other raw materials into the second section independently of the raw material introduced at the upper end of the first section, and means to mingle the material from the first section and the material discharged from the second section, the shell of the first section being extended beyond and surrounding the second section.

3. The combination in a rotary kiln of means to introduce fuel at the discharge end of the kiln, a kiln section having heat transmitting devices therein, a second kiln section also having heat transmitting devices therein, means to introduce raw material at the upper end of the first section, means to prevent passage of the raw material from the first section into the second section while permitting passage of hot gases of combustion from the second section to the first section, means to introduce other raw materials into the second section independently of the raw material introduced at the upper end of the first section, and means to mingle the material from the first section and the material discharged from the second section, the second section being formed as a truncated cone with its larger end toward the feed end of the kiln.

4. The combination in a rotary kiln of means to introduce fuel at the discharge end of the kiln, a kiln section having heat transmitting devices therein, a second kiln section also having heat transmitting devices therein, means to introduce raw material at the upper end of the first section, a tube extended through the first section and arranged to deliver material into the second section, means to prevent passage of the raw material from the first section into the second section while permitting passage of the hot gases of combustion from the first section to the second section, and means to mingle material from the first section and the material discharged from the second section.

5. The combination in a rotary kiln of means to introduce fuel at the discharge end of the kiln, a kiln section having heat transmitting devices therein, a second kiln section also having heat transmitting devices therein, means to introduce raw material at the upper end of the first section, a trough for the reception of other material and means to transfer material from the trough into the second section, means to prevent passage of the raw material from the first section into the second section while permitting passage of the hot gases of combustion from the first section to the second section, and means to mingle material from the first section and the material discharged from the second section.

JOHAN S. FASTING.